Nov. 8, 1938. B. C. WHITE Re. 20,912

ROLL CHANGER FOR PRINTING PRESSES

Original Filed June 20, 1923 14 Sheets-Sheet 1

INVENTOR
BRUCE CLARK WHITE,
DECEASED,
R. HOE & CO., INC., ASSIGNEE,
By Philip Lawyer, Rick Kennedy
ATTORNEYS Nov. 8, 1938. B. C. WHITE Re. 20,912

ROLL CHANGER FOR PRINTING PRESSES

Original Filed June 20, 1923 14 Sheets-Sheet 2

INVENTOR
BRUCE CLARK WHITE,
DECEASED,
R. HOE & CO., INC., ASSIGNEE,
By Philip Barnard Rice & Kennedy
ATTORNEYS Nov. 8, 1938. B. C. WHITE Re. 20,912

ROLL CHANGER FOR PRINTING PRESSES

Original Filed June 20, 1923 14 Sheets-Sheet 3

INVENTOR
BRUCE CLARK WHITE,
DECEASED,
R. HOE & CO., INC., ASSIGNEE,
By Philip Sawyer Rice Kennedy
ATTORNEYS Nov. 8, 1938. B. C. WHITE Re. 20,912

ROLL CHANGER FOR PRINTING PRESSES

Original Filed June 20, 1923 14 Sheets-Sheet 4

INVENTOR
BRUCE CLARK WHITE,
DECEASED,
R. HOE & CO., INC., ASSIGNEE,
By Philip Lawrence Kennedy
ATTORNEYS Nov. 8, 1938. B. C. WHITE Re. 20,912

ROLL CHANGER FOR PRINTING PRESSES

Original Filed June 20, 1923 14 Sheets-Sheet 5

INVENTOR
BRUCE CLARK WHITE,
DECEASED,
R. HOE & CO., INC., ASSIGNEE,
By Philip Sawyer, Lee & Kennedy
ATTORNEYS Nov. 8, 1938. B. C. WHITE Re. 20,912

ROLL CHANGER FOR PRINTING PRESSES

Original Filed June 20, 1923 14 Sheets-Sheet 6

INVENTOR
BRUCE CLARK WHITE,
DECEASED,
R. HOE & CO., INC., ASSIGNEE
By Philipp Lampert & Kennedy
ATTORNEYS Nov. 8, 1938. B. C. WHITE Re. 20,912

ROLL CHANGER FOR PRINTING PRESSES

Original Filed June 20, 1923 14 Sheets-Sheet 7

INVENTOR
BRUCE CLARK WHITE,
DECEASED,
R. HOE & CO., INC., ASSIGNEE,
By Philip Sawyer Ricott Kennedy
ATTORNEYS Nov. 8, 1938. B. C. WHITE Re. 20,912

ROLL CHANGER FOR PRINTING PRESSES

Original Filed June 20, 1923 14 Sheets-Sheet 8

INVENTOR
BRUCE CLARK WHITE,
DECEASED,
R. HOE & CO., INC., ASSIGNEE,
By Philip Sawyer, Alex Kennedy
ATTORNEYS

ROLL CHANGER FOR PRINTING PRESSES

Original Filed June 20, 1923 14 Sheets-Sheet 9

INVENTOR
BRUCE CLARK WHITE,
DECEASED,
R. HOE & CO., INC., ASSIGNEE,
By Philip Sawyer Rice & Kennedy
ATTORNEYS

ROLL CHANGER FOR PRINTING PRESSES

Original Filed June 20, 1923 14 Sheets-Sheet 10

INVENTOR
BRUCE CLARK WHITE,
DECEASED,
R. HOE & CO., INC., ASSIGNEE,
By Philipp Sawyer Rice & Kennedy
ATTORNEYS Nov. 8, 1938. B. C. WHITE Re. 20,912

ROLL CHANGER FOR PRINTING PRESSES

Original Filed June 20, 1923 14 Sheets-Sheet 11

INVENTOR
BRUCE CLARK WHITE,
DECEASED,
R. HOE & CO., INC., ASSIGNEE,
By Philipp Sampson Rice & Kennedy
ATTORNEYS Nov. 8, 1938. B. C. WHITE Re. 20,912
ROLL CHANGER FOR PRINTING PRESSES
Original Filed June 20, 1923 14 Sheets-Sheet 12
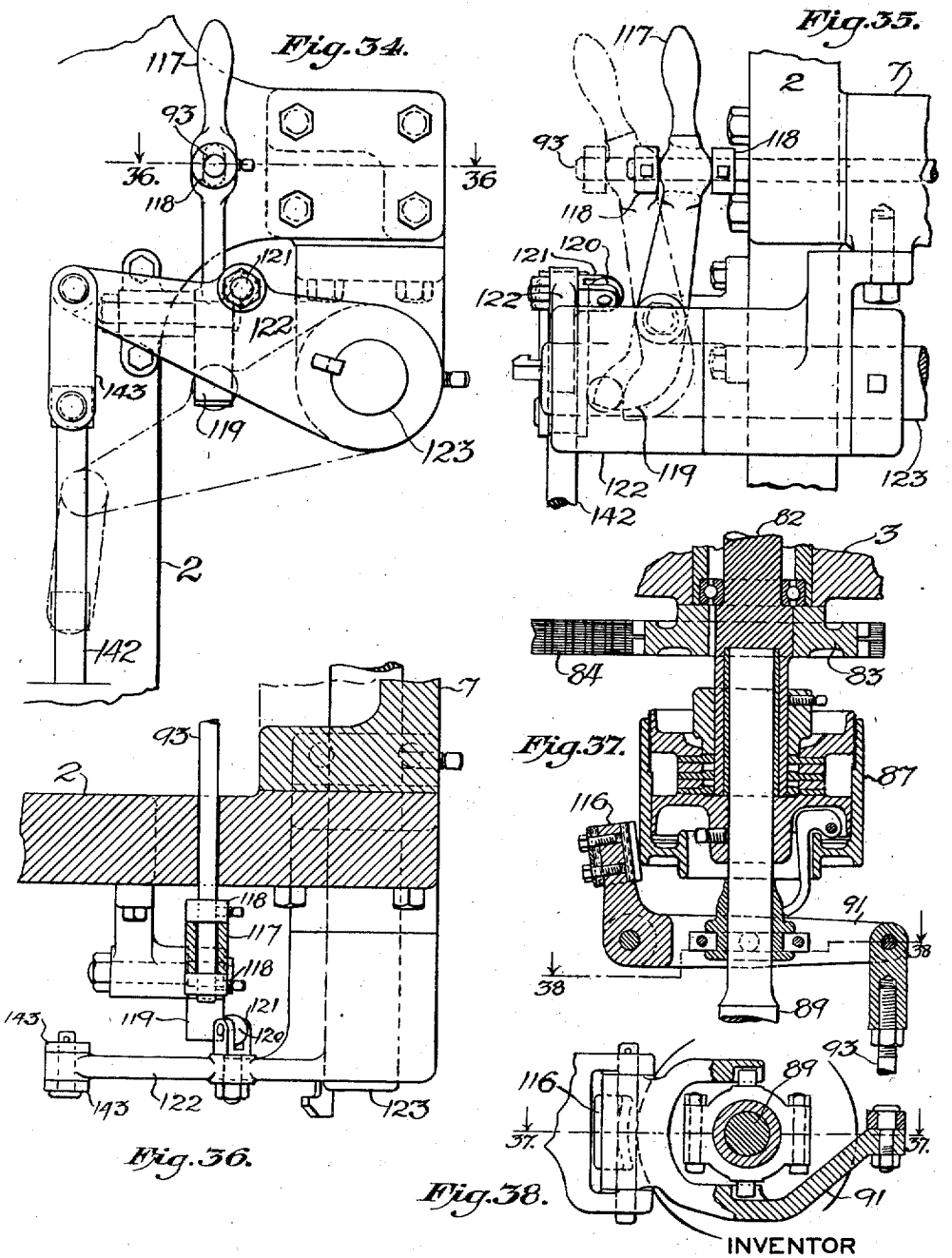
INVENTOR
BRUCE CLARK WHITE,
DECEASED,
R. HOE & CO., INC., ASSIGNEE,
By Philipp Sawyer & Kennedy
ATTORNEYS

ROLL CHANGER FOR PRINTING PRESSES

Original Filed June 20, 1923 14 Sheets-Sheet 13

INVENTOR
BRUCE CLARK WHITE,
DECEASED,
R. HOE & CO., INC., ASSIGNEE,
By Philip Sawyer Reed Kennedy
ATTORNEYS Nov. 8, 1938. B. C. WHITE Re. 20,912

ROLL CHANGER FOR PRINTING PRESSES

Original Filed June 20, 1923 14 Sheets-Sheet 14

INVENTOR
BRUCE CLARK WHITE,
DECEASED,
R. HOE & CO., INC., ASSIGNEE,
By Philipp Sawyer Rickenmeyer
ATTORNEYS Reissued Nov. 8, 1938

Re. 20,912

UNITED STATES PATENT OFFICE 20,912

ROLL CHANGER FOR PRINTING PRESSES

Bruce C. White, deceased, late of New York, N. Y., by Irving Trust Company, New York, N. Y., trustee for and assignor to R. Hoe & Co., Inc., New York, N. Y., a corporation of New York Original No. 1,855,503, dated April 26, 1932, Serial No. 646,592, June 20, 1923. Application for reissue April 4, 1934, Serial No. 719,061

61 Claims. (Cl. 242—58)

This invention relates to that class of printing presses wherein the paper to be printed is in the form of webs drawn from rolls through the machine.

The principal objects of the invention are to facilitate the supply of the rolls of paper and to insure the webs of successive rolls automatically assuming such connected relation that the paper from a plurality of succeeding rolls will be fed to the printing machine in a continuous web, without necessarily involving the interruption of the printing operation.

Another object of the invention is to provide improved means for speeding up and controlling the speed of the fresh rolls, and the speed and stoppage of the expiring rolls independently.

Another object of the invention is to provide a simple, semi-automatic control for the paster and web severing devices.

Another object of the invention is to provide an automatic means for marking the particular folded papers or units of the product which contain the pasted or doubled portion of any web which goes to make up the product.

Other objects of the invention are to provide roll-changer mechanisms which can be fitted to a printing press in place of the usual paper roll brackets, also means for facilitating the handling of the fresh roll, whether of full or half width, and adapted to rolls having either a paper or an iron core tube.

The foregoing and other objects of the invention will appear in the machine herein described and claimed and shown in the accompanying drawings, in which:

Fig. 28 is a plan view partly in section on line 28—28 of Fig. 30 showing the paster and severing knife mechanism.

Fig. 29 is a fragmentary plan view of the marker for indicating the position of the pasted papers in the product.

Fig. 30 is a vertical section of paster and its operating mechanism on line 30—30 of Fig. 28.

Fig. 31 is a vertical section through the paster operating cylinder on line 31—31 of Fig. 28.

Fig. 32 is a detail section on line 30—30 of

Figures 28, 29, 30, 31, 32, 33:
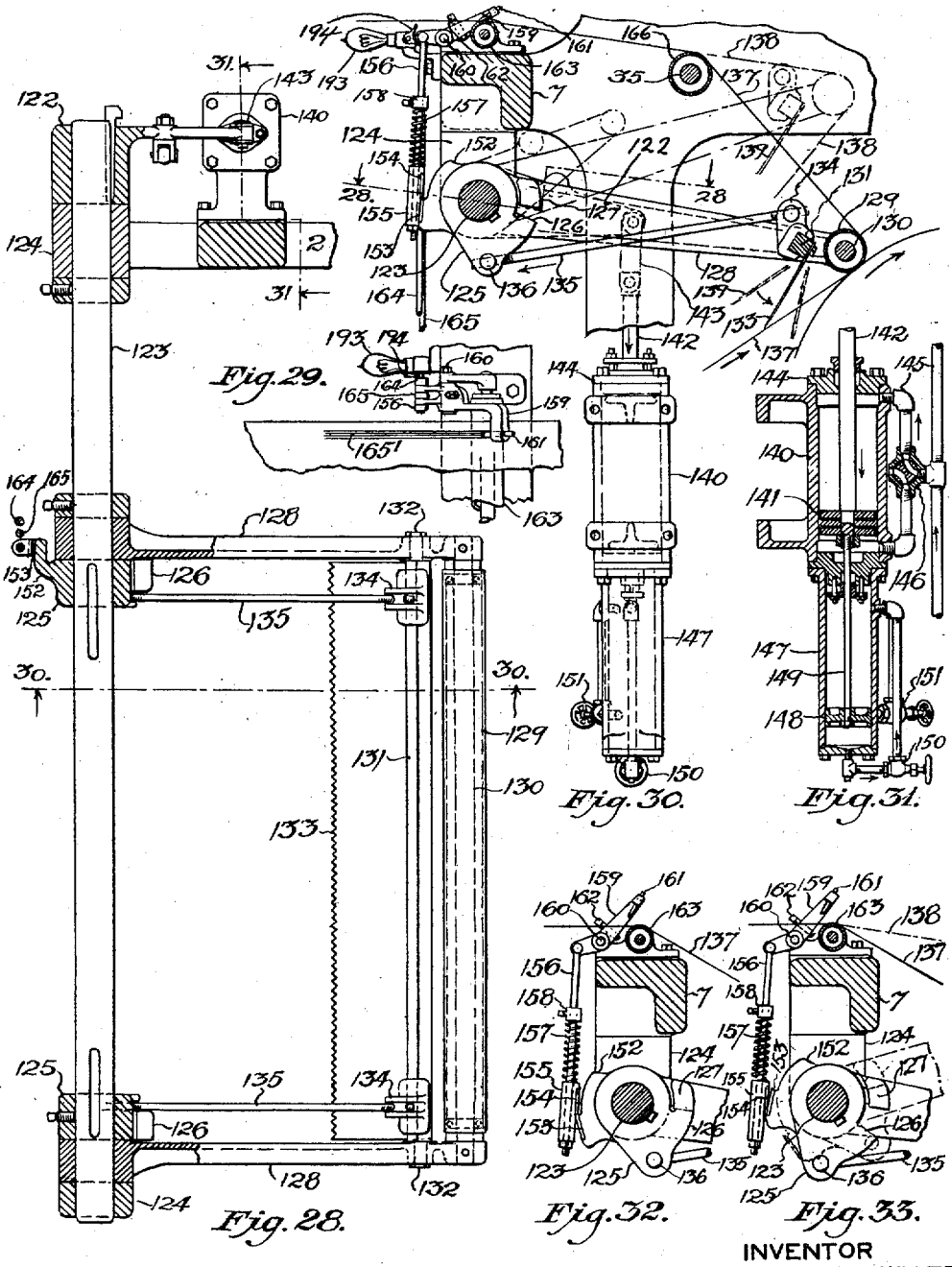

Fig. 28, showing the marker about to be moved into contact with the paper and in advance of the position shown in Fig. 30.

Fig. 33 is a view similar to Fig. 32 showing the marker and connected parts in the position immediately following that of Fig. 30 and out of marking contact.

Fig. 34 is a front elevation of the lever which actuates the paster and the clutch coupling of the expiring roll traction belt.

Fig. 35 is a side elevation of same.

Fig. 36 is a horizontal section of same on line 36—36 of Fig. 34.

Fig. 37 is a horizontal section showing in detail the frictional cut-off coupling of the traction belt drive and brake and is taken along line 37—37 of Fig. 38.

Fig. 38 is a detail of the clutch lever shown partly in section along line 38—38 of Fig. 37.

Figure 39:
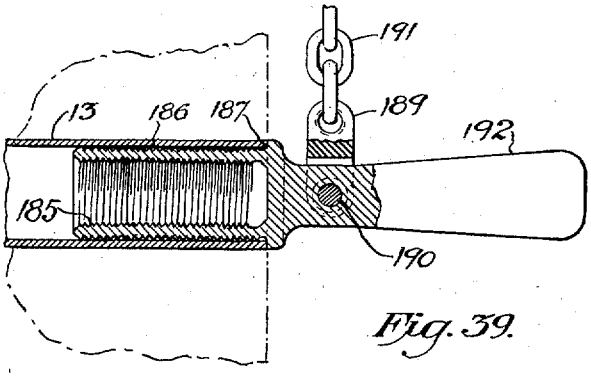
Figure 40:
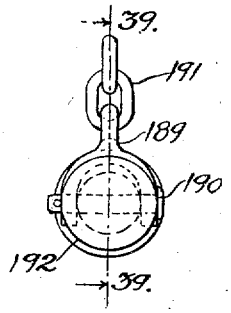

Fig. 39 is a detail view of a hoisting plug being a section on line 39—39 of Fig. 40 and as used with a roll center tube.

Fig. 40 is an end view of same.

Figure 41:
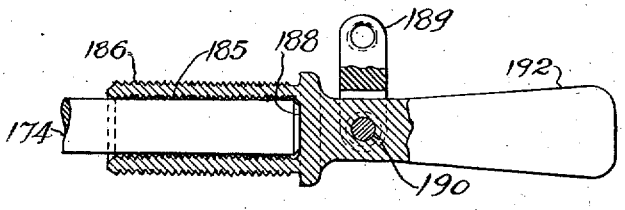

Fig. 41 is a section of same on line 39—39 showing the hoisting plug used in connection with a roll spindle.

Figure 42:
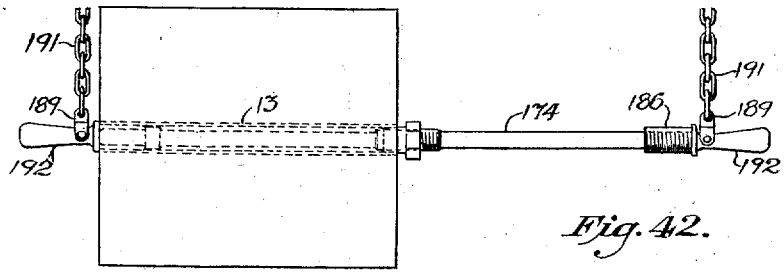

Fig. 42 shows the plugs in use on a half roll, and

Figure 43:
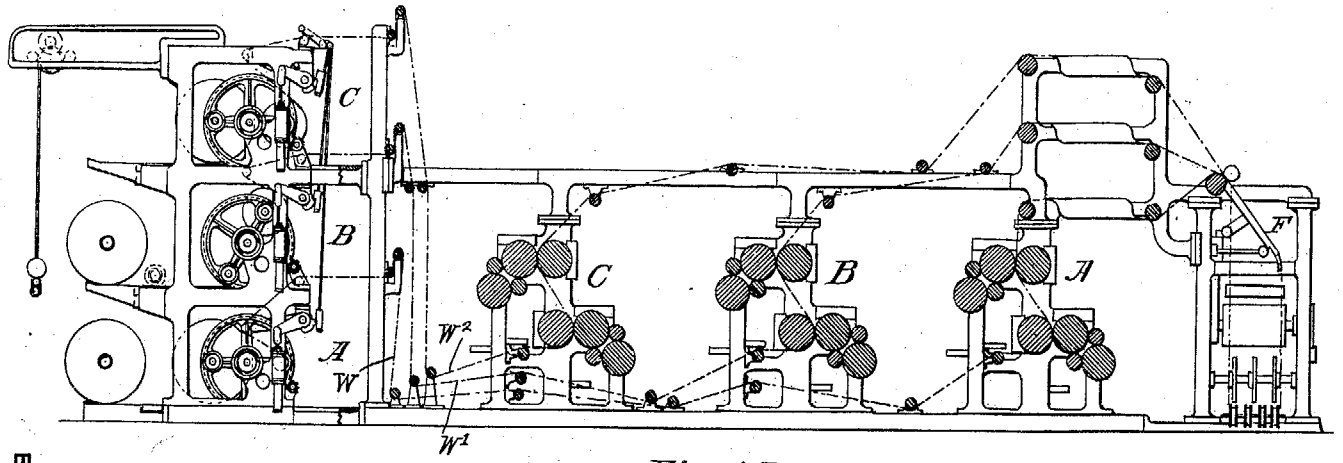

Fig. 43 is a diagrammatic partly sectional side elevation of the invention as used with a printing press.

Similar numbers indicate like parts in all the figures.

In the embodiment of the invention disclosed herein A indicates a lower roll-changer, B a middle roll-changer and C a top roll-changer approximately as arranged at the end of a three-web or sextuple printing press.

1 indicates a base plate to which are bolted the upright front frame 2, and the upright rear frame 3, also the lower roll support 4.

The frames are tied together by means of the outer cross ties 5, the middle cross ties 6 and the inner cross ties 7. To the outer cross ties 5 are bolted extension brackets 8 for supporting temporarily the fresh paper rolls 9 which may be replaced thereon with the aid of a paper roll hoist of the usual type but not shown. Likewise a fresh roll 10 may be placed upon the support 4.

Considering now the lower or A deck, a fresh roll 11 has already been rolled inward sufficiently to be secured in the roll holder 12, this roll holder being shown in the form of a pair of spaced heads.

Figure 4:
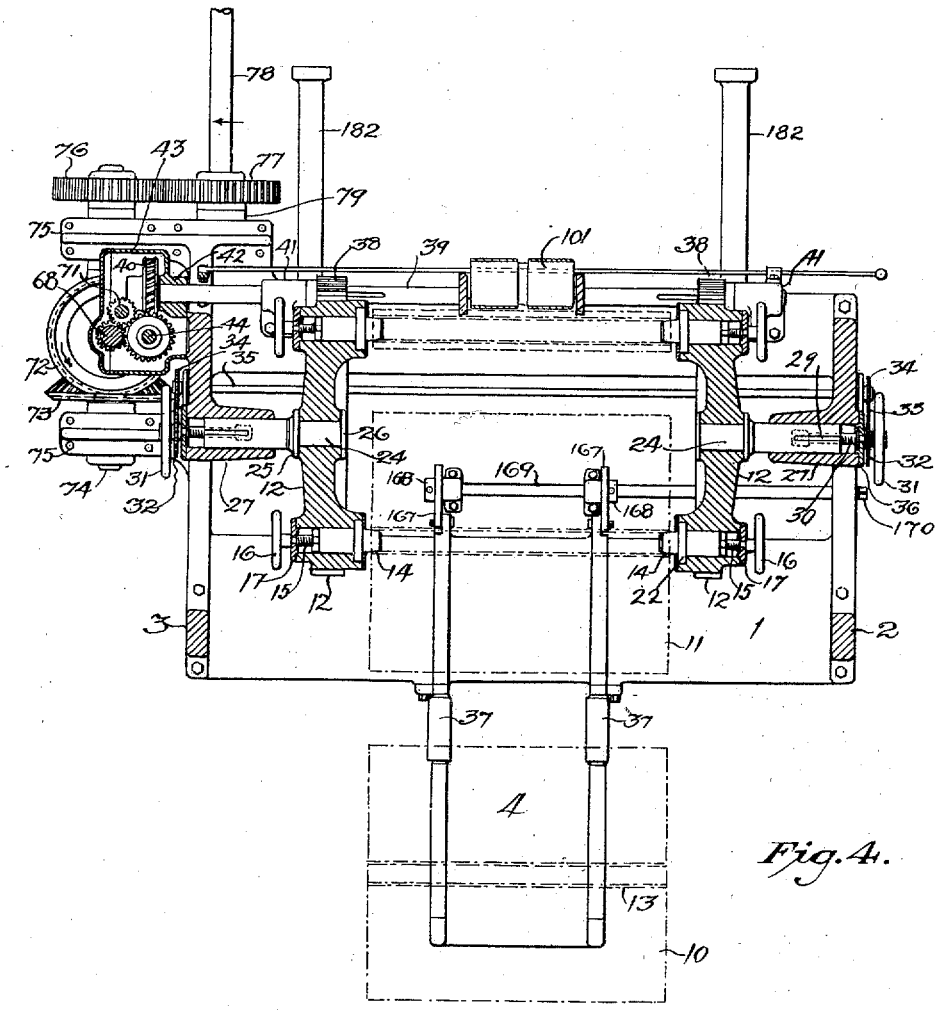
Fig. 4 is a horizontal section on line 4—4 of Fig. 1.
Figure 5:
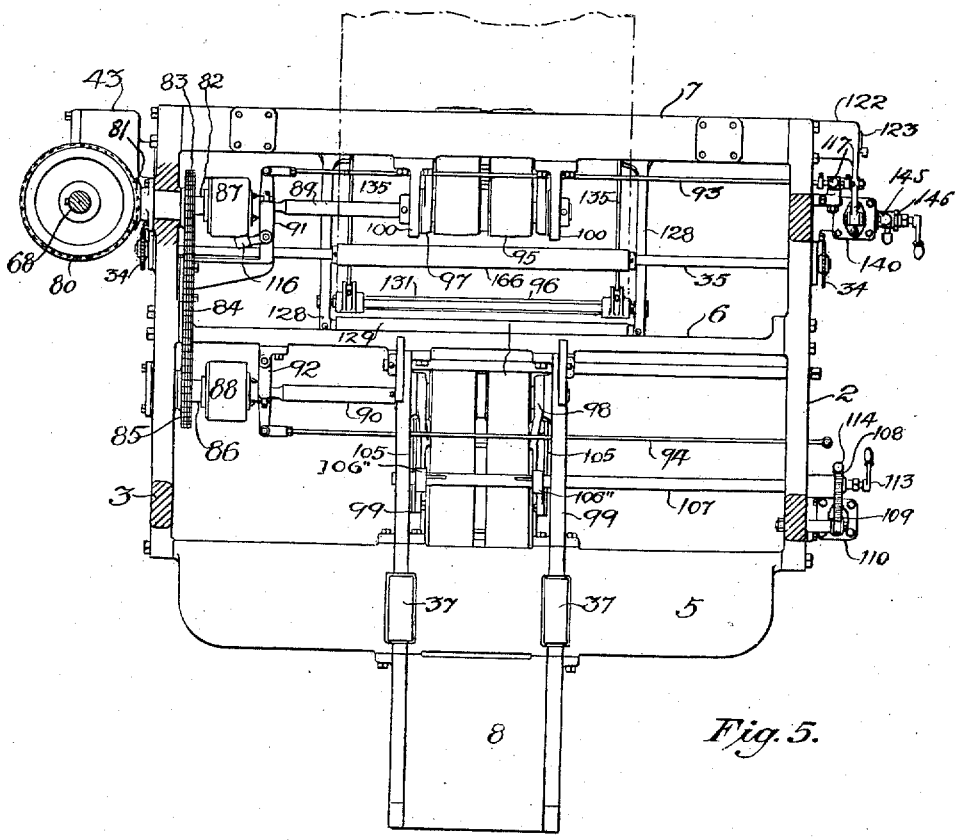
Fig. 5 is a horizontal section on line 5—5 of Fig. 1.
Figure 6:
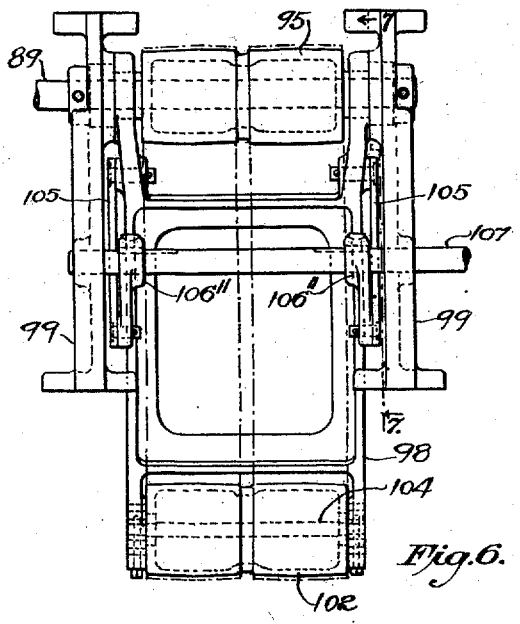
Fig. 6 is a detail on a larger scale than that of the preceding figures of the traction belts.
Figure 18:
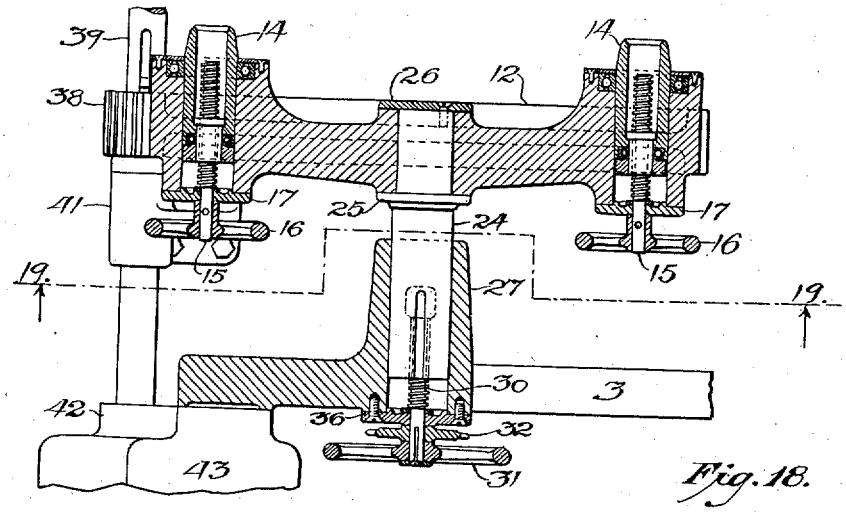
Fig. 18 is a horizontal section on line 18—18 of Fig. 19 showing one of the roll holders.
Figure 19:
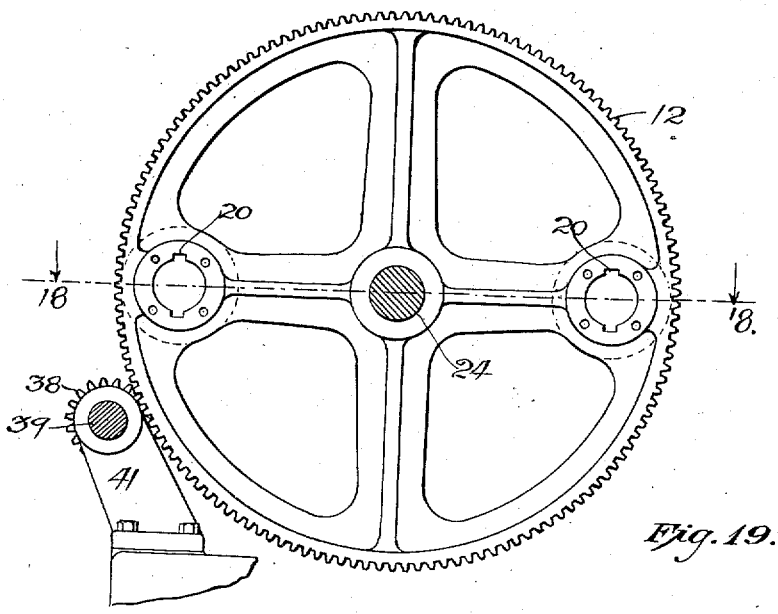
Fig. 19 is a vertical section on line 19—19 of Fig. 18.
Figure 20:
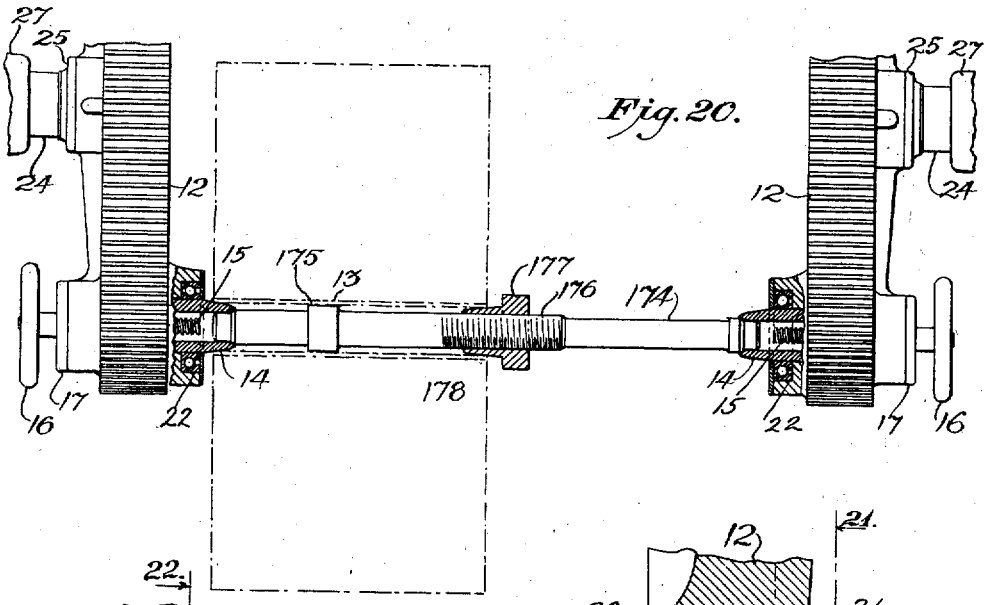
Fig. 20 is a plan view partly in section on line 18—18 of Fig. 19 and showing a half width roll of paper with its spindle.
Figure 21:
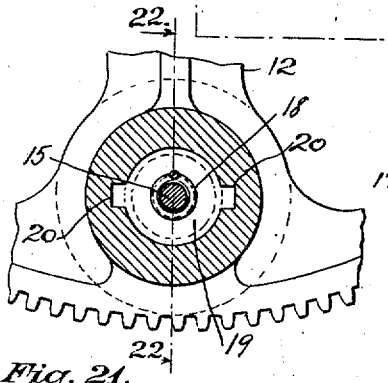
Fig. 21 is a detail section of the roll holder on line 21—21 of Fig. 22.
Figure 22:
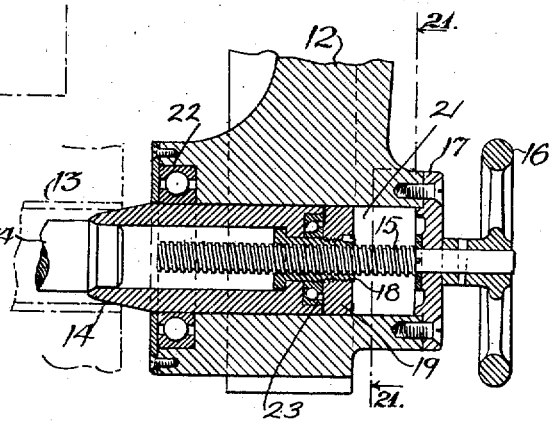
Fig. 22 is a section of same on line 22—22 of Fig. 21.
Figure 23:
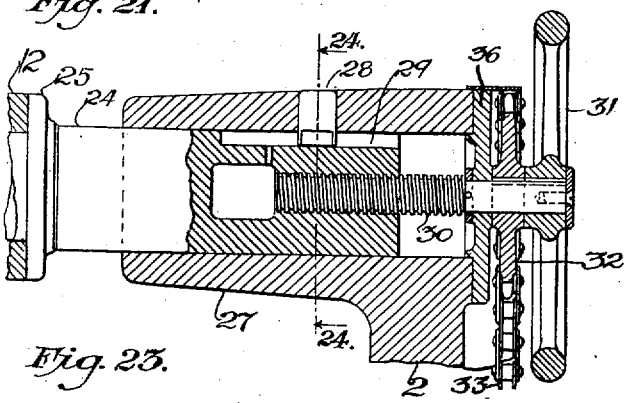
Fig. 23 is a section of same on line 23—23 of Fig. 24.
Figure 24:
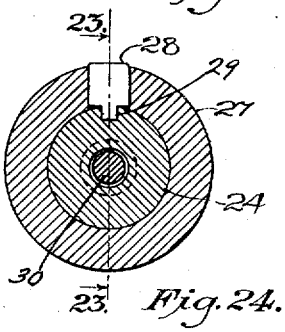
Fig. 24 is a section of same on line 24—24 of Fig. 23.

Paper is generally wound upon an iron pipe or core tube 13, see dotted lines in Figs. 4, 20 and 22. To support and center a fresh roll of paper in the roll holders 12 having first properly positioned it, the taper plugs 14 are forced into both ends of the core tube 13 by means of the screws 15 and hand-wheels 16 having their bearings in the plate 17, see Figs. 18 and 22. A traveling nut 18 having screw threaded engagement with the screw 15 is secured fixedly to the nut-plate 19. The latter is provided with projecting lugs which are free to slide longitudinally in the keyways 20 of the holes 21 bored through the heads on opposite sides thereof and near their periphery. Preferably anti-friction ball bearings 22 and 23 are introduced to carry the weight and endwise thrust sustained by the taper plugs 14 which latter are free to rotate in the reels by the rotation of the paper rolls.

The heads 12 are journalled upon the non-rotating centers 24 and are held against endwise movement thereon by means of the flange 25 and collar plate 26. The reel centers 24 are fitted to slide freely endwise in the hubs 27 projecting inward from the frames 2 and 3, but are prevented from rotating therein by the key plug 28, the flatted inner end of which has sliding engagement in the keyway 29 of the center, thus leaving the latter free to be moved endwise in the frame hubs by means of the screw 30 to which is secured the hand wheel 31.

A sprocket wheel 32 is also secured to the screw 30 and has a sprocket chain 33 trained about it and also about a sprocket 34 on each end of a shaft 35, see Fig. 4. By this means the operator in turning either of the hand wheels 31 will rotate both screws 30 in the same direction in a manner to screw both centers 24 and consequently both heads and the rolls of paper mounted therein either to the right or left, as may be desired, in order to properly introduce the web into the printing elements of the press. The screw 30 has its bearing in a plate 36.

The heads 12 are preferably adjusted to give only sufficient space for the introduction of the paper rolls between them, which latter are of uniform size, hence may be readily positioned and centered. To facilitate the correct placing of the rolls small anti-friction rollers 37 are let into suitable recesses in the roll support 4 and outer cross ties 5 whereby the fresh roll may be moved easily to the right or left as required. These rollers 37 are utilized to remove the exhausted rolls laterally from the machine, as will be more fully explained.

The heads 12 are provided with heavy spur gears and are provided with external gear-teeth which mesh into toothed pinions 38 keyed to the pinion shaft 39. To the latter is keyed a worm wheel 40. Bearings 41 upon the inner cross tie 7 support the shaft 39, which latter is further supported in a journal 42 in the gear box 43, see Fig. 4.

A vertical worm shaft 44 having a worm 45 formed thereon is journalled in bearings 46 and 47. The worm shaft 44 is provided with feathers 48 upon which the double leather faced cone 49 is free to slide vertically. A split collar 50 is clamped into a groove in the said double cone in which it is free to turn. The split collar is held from rotation by the stud 51. The split collar is linked to an eccentric shaft 52, journalled in the cap 53 by links 54. The links engage projecting trunnions 55 on the split collar and eccentric projections 56 on the shaft 52. The latter is rotated by a curved arm 57 which in turn is connected by a link 58 to one arm 59 of a bell crank 60. The latter is journalled upon a stud 61 and its depending arm 62 is connected by a rod 63 to the operating or front side of the machine.

Figure 14:
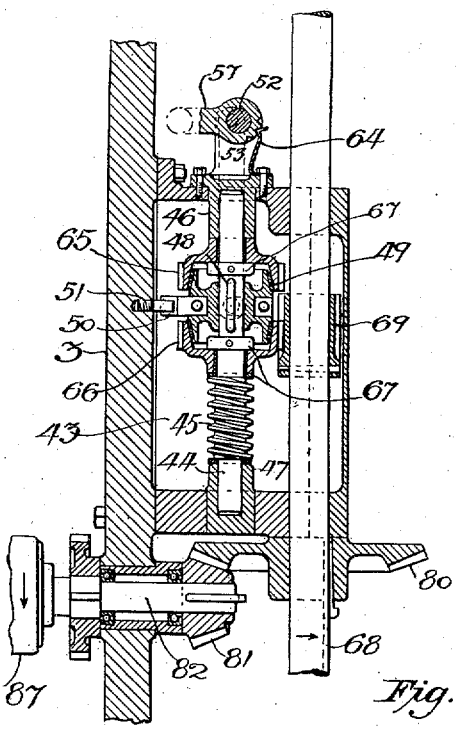
Fig. 14 is a vertical section on line 14—14 of Fig. 15.
Figure 15:
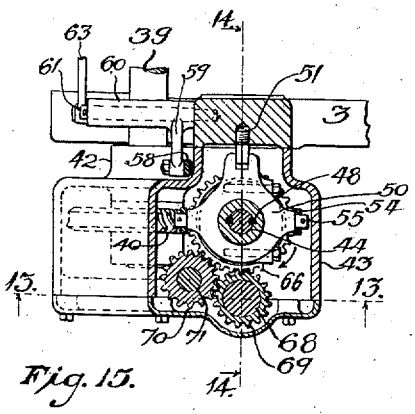
Fig. 15 is a horizontal section on line 15—15 of Fig. 13.
Figure 17:
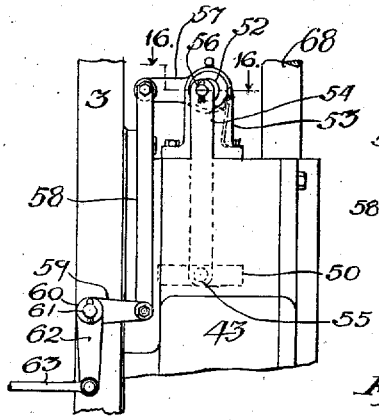
Fig. 17 is a side elevation of the clutch control levers, which with the preceding four figures relate to the traction belt and roll holder drives.
Figure 16:
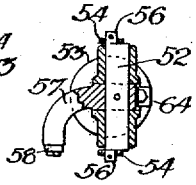
Fig. 16 is a detail section on line 16—16 of Fig. 17, showing the clutch control eccentrics.

The arm 57 is notched for a spring 64, see Fig. 14, which tends to hold said arm in any one of three positions, one representing the clutch cone forced upward, one representing it forced downward and one in a middle position.

Above and below the double cone clutch are spur gears 65 and 66 having internal surfaces corresponding with the conical surfaces of the double cone clutch. Said gears are provided with collars 67 to prevent their endwise movement on the worm shaft upon which they are both free to turn.

68 is a vertical driving shaft to which is secured a pinion 69 which latter meshes into the lower cone gear 66 and also into an intermediate gear 70 upon the shaft 71. The gear 70 also meshes into the upper cone gear 65 whereby the lower cone gear 66 being driven direct from the shaft 68 will rotate in one direction, while the upper cone gear 65 being driven through an intermediate gear 70 will rotate in the opposite direction. It follows that if the double cone 49 is thrust upward to engage the gear 65 the worm will be rotated in one direction while if the double cone is forced downward to engage gear 66 the worm will be rotated in the opposite direction. If the double clutch cone is retained in mid-position it will be out of contact with both gears and will not rotate but will hold the worm gear 40, and pinions 38 from rotation and hence lock the heads 12 in any position desired. The gearing just described is preferably enclosed in the gear box 43.

The vertical driving shaft 68 is keyed into a bevel gear 72 which meshes with a bevel gear 73, keyed to the shaft 74 which is journalled in bearing 75. The shaft 74 is keyed into the spur gear 76 which in turn is driven by the spur gear 77 keyed to the way-shaft 78 of the printing press. Suitable bearings 79 are provided for the way-shaft. Bevel gears 80 mesh with and drive pinions 81 upon the shafts 82 one for each deck. Chain sprockets 83 upon the shafts 82 drive through the pitch chains 84 the chain sprockets 85 secured to the shafts 86. Both the shafts 82 and the shafts 86 are preferably mounted in ball bearings. Both shafts terminate in one element of the friction cut-off couplings 87 and 88 which latter are driven in one direction at a speed corresponding with that of the web.

Extending across the machine from the cut-off couplings are two pulley shafts 89 and 90 for each deck to which are secured the other friction elements of the cut-off couplings. When the friction elements of the said couplings are brought into contact by means of the clutch levers 91 and 92 the shafts 89 and 90 will partake of the rotation of the shafts 82 and 86 or either of them. Rods 93 and 94 extend from the clutch levers to the operating or front side of the machine.

Upon the shafts 89 and 90 are fixedly secured pulleys 95 and 96. Swinging frames 97 and 98 are journalled in the rail pieces 99 and bracket 100 concentric with the journals of the shafts 89 or 90, which latter journals are made preferably in the form of ball bearings. The swinging frames 97 and 98 carry pulleys 101 and 102 which run freely upon their shafts 103 or 104, preferably with ball bearing journals thereon. Said shafts are mounted in adjustable end blocks 106 provided with adjusting screws 106', whereby tension of the belts 500 trained about the pulleys 95 to 101 and the belts 501 about the pulleys 96 to 102 may be adjusted.

Figure 1:
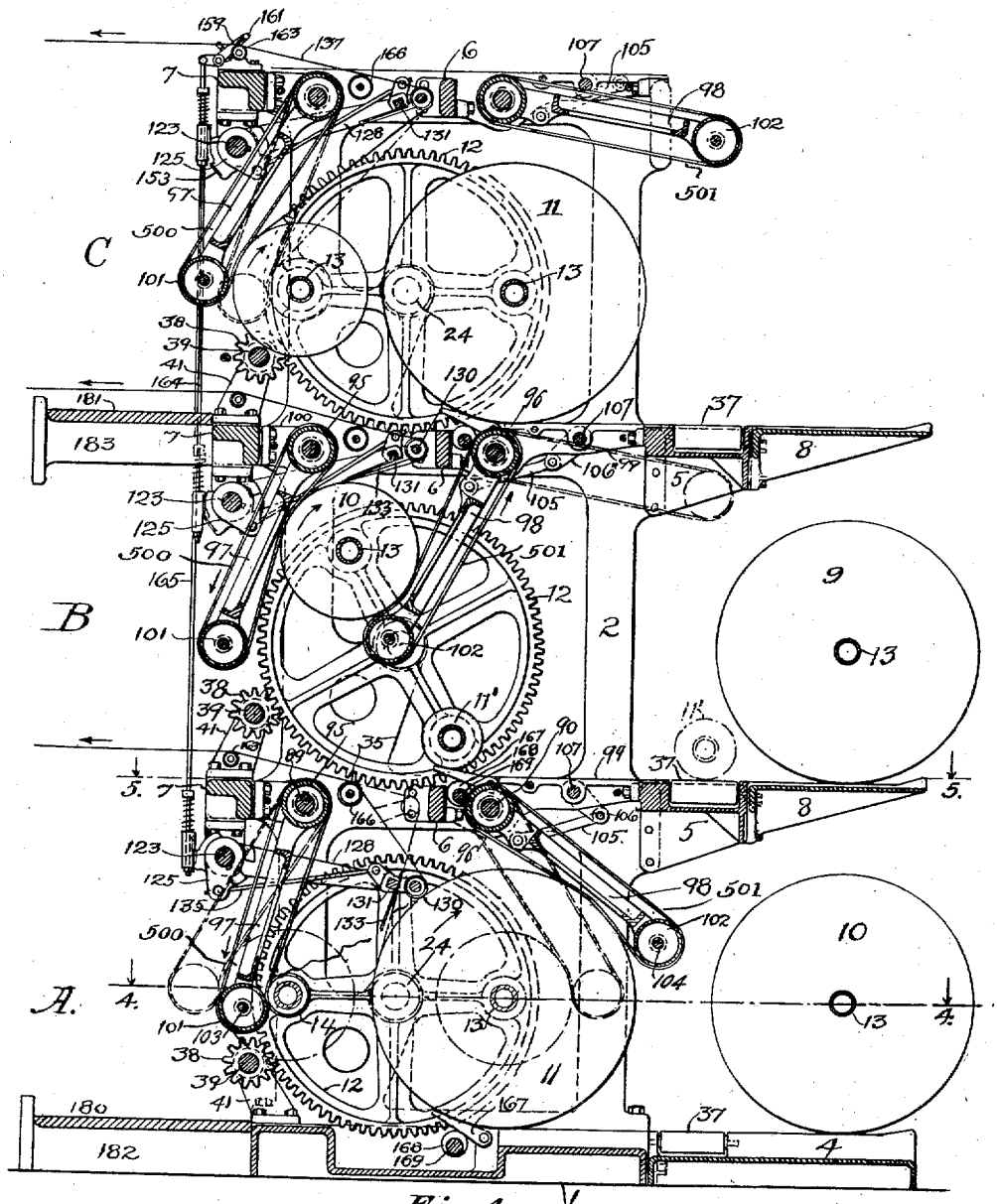
Figure 1 is a vertical section on the roll-changing devices as adapted to a three-roll press, each deck being shown with the paper rolls in a different position.
Figure 2:
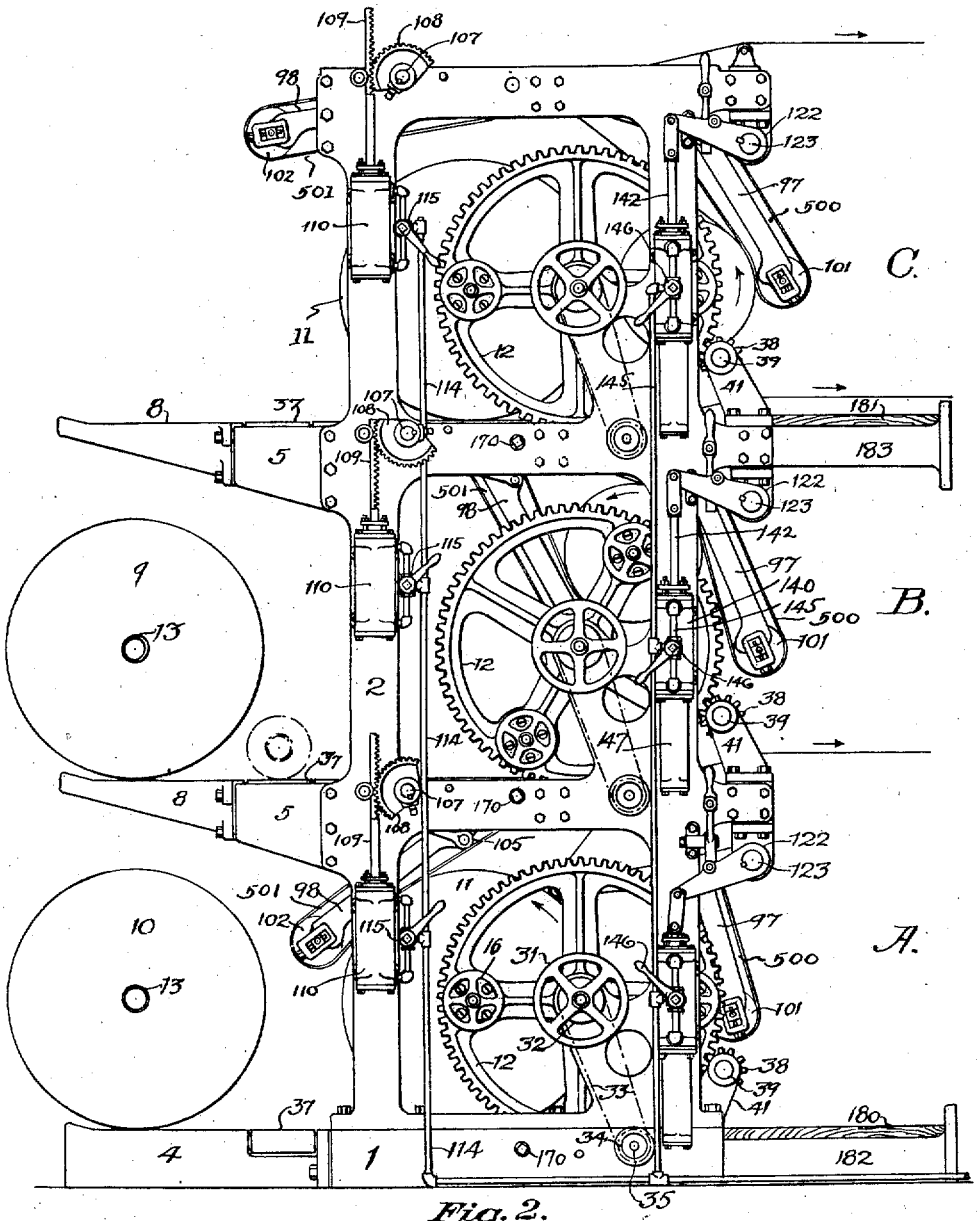
Fig. 2 is a side elevation of the operating or front side of the roll-changer.
Figure 3:
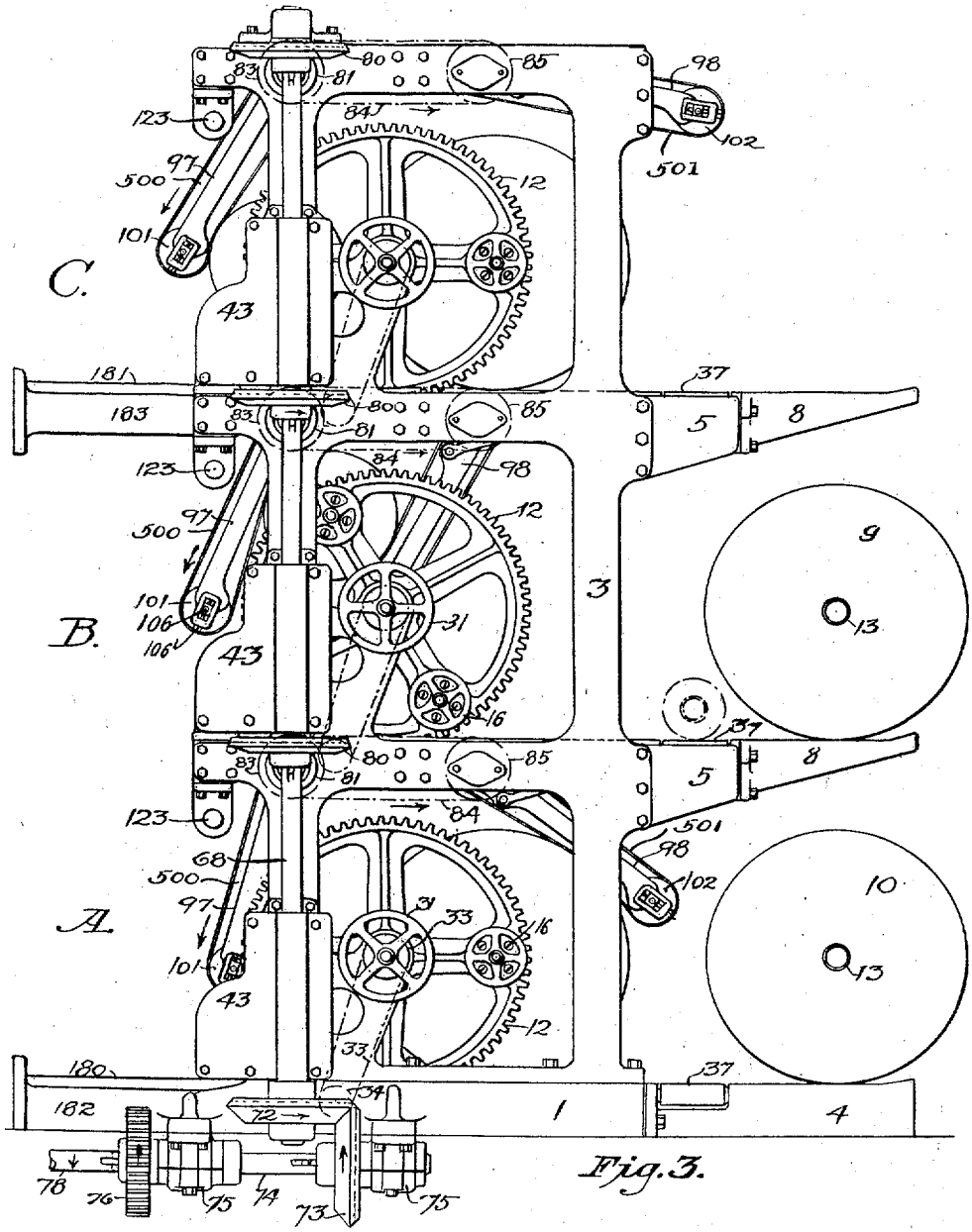
Fig. 3 is a side elevation of the driving or rear side of the roll-changer.
Figure 7:
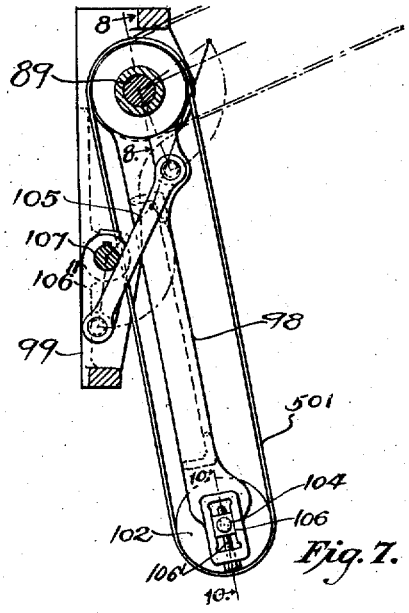
Fig. 7 is a section of same on line 7—7 of Fig. 6.
Figure 8:
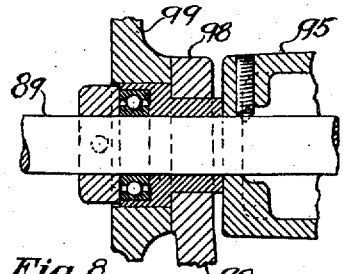
Fig. 8 is an enlarged section of the driving-shaft, pulley and journal bearing of the traction device.
Figures 9, 10:
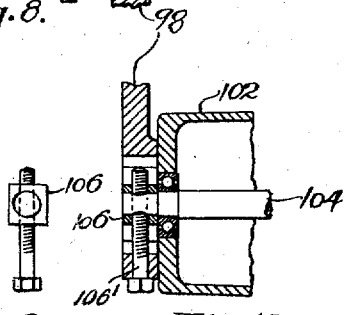
Figs. 9 and 10 are details of the outer traction belt, pulleys and journal bearings.
Figure 11:
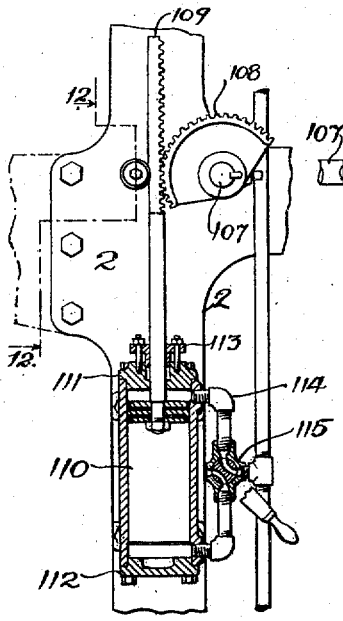
Fig. 11 is a detail section of the control cylinder for the speed up traction belt on line 11—11 of Fig. 12.
Figure 12:
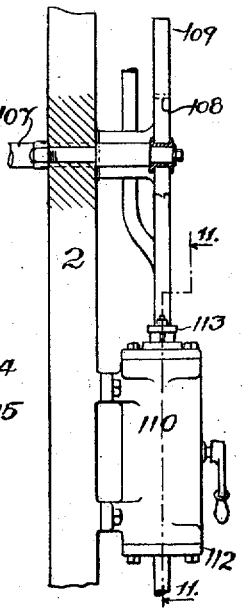
Fig. 12 is a side elevation partly in section along line 12—12 of Fig. 11, showing the same parts as in Fig. 11.
Figure 13:
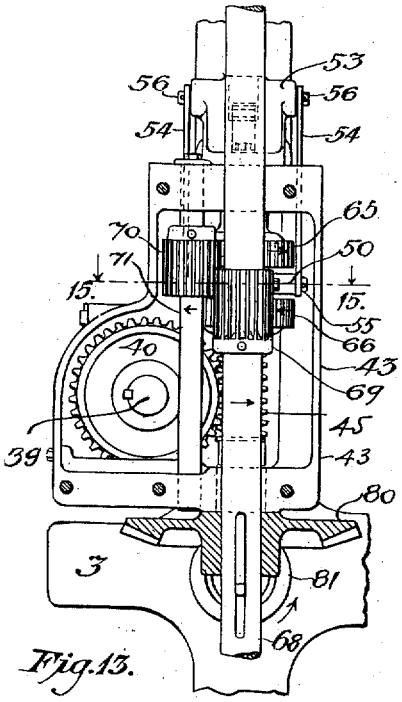
Fig. 13 is a section on line 13—13 of Fig. 15 showing the reversible roll holder drive.

The outer swinging frame 98 is connected by links 105 to arms 106'' keyed to the shaft 107, see Fig. 7. The latter is journalled in the rail pieces 99 and also in the front frame 2 through which it projects and has keyed to it a segment gear 108. Meshing with the segment gear is a rack-bar 109 which forms, as it extends downward, the piston-rod of a double acting air cylinder 110. At the lower end of this rod is secured a piston fitted to slide freely in said cylinder. The usual cylinder heads 111 and 112, with stuffing box 113, and air pipes 114 with a 4-way valve 115 complete this device, which is designed to raise and lower the pulley frame 98 to lift it bodily out of the path of the incoming fresh roll, or to lower the traction belt into contact with said roll to cause it to rotate and to follow its surface as it unwinds its web and reduces its diameter, also to follow it as it is moved upward and inward toward its expiring position, as shown in the relative position of the parts on the B deck, Fig. 1.

The inner clutch cut-off coupling 87, which drives the inner traction pulleys 95, is operated through the clutch rod 93 and clutch lever 91. The latter is provided with an arm 116, formed and adapted to bear against the outside surface of clutch 87, and to act thereon as a friction brake, to quickly stop the shaft 89 when the clutch is released, utilizing the clutch releasing movement of rod 93 to apply the brake 116 as shown in Figs. 37 and 38.

The clutch rod 93 is operated by a handle 117, acting between collars 118 on said rod. The handle 117 may be moved by the operator to stop or start the inner traction belts. Additional and automatic means are provided for disconnecting the clutch coupling 87 and applying the brake thereto consisting in a downwardly extending cam-shaped part 119 of the handle 117, in the path of a roller 120, mounted in a forked bearing 121 secured to the inner face of a swinging arm 122, see Figs. 34, 35 and 36. These parts are so arranged that when the arm is in the position shown in full lines in Fig. 34, the handle may be moved in either direction. When the arm 122 is lowered to the position shown in dotted line in Fig. 34, the roller 120 will force the lower end of lever 117 inward, thus pulling the rod 93 outward to release the clutch and set the brake 116. The lever 122 is keyed to the paster shaft 123, which latter extends across the machine and is journalled in bearings 124 secured to cross-tie 7. Keyed to the shaft 123 are arms 125 which latter have projecting lugs 126. These lugs are adapted to engage corresponding lugs 127 formed upon and projecting inwardly from the pasting arms 128.

Extending between the pasting arms is a pasting roller 129 preferably mounted to run upon ball bearings upon the non-rotating shaft 130. A square knife-bar 131 is pivoted upon screw-pivots 132, and has secured to it a knife blade 133 of a length corresponding with the width of the web. The knife-bar 131 is operated by arms 134 secured thereto and connected by adjustable rods 135 to pivot pins 136 in the arms 125. The knife 133 is normally out of the path of the web, which is indicated on Fig. 30 in full lines 137 when in pasting position, and in dotted lines 138 when in normal position. While the arms 128 are supported by the arms 125 through the contact of their lugs 126 and 127 they may be raised and lowered without affecting the relative position of the knife 133. When the pasting roller 129 is lowered to meet the fresh paper roll as in deck A Fig. 1 the arms 128 will stop. Any further rotation of the shaft 123 will continue to swing the arms 125 rearwardly and with them the rods 135 and arms 134, thus turning the square shaft 131, whose pivots are now stationary, in a manner to swing the knife 133 into and across the path of the web 137 and sever the same. The reverse movement of the shaft 123 first swings the knife back to its normal position 139 then swings the arms 128 with its attached parts upwardly to the position shown in dotted lines in Fig. 30 and as shown in deck B Fig. 1 up out of the way of the paper roll.

It is not expected nor intended that the paster roller shall apply the web from the expiring roll to the surface of the fresh roll with any reference to the angular position of the pasted area upon the latter, as the rapid rotation of the fresh roll when making a paste at full speed would make such timing impractical. Any automatic device for timing the pasting movement to the pasted area is likewise complicated and unsatisfactory due to the high speed and variation in the diameter of the fresh rolls. It is preferable to make the pasting movement regardless of the position of the pasted place upon the fresh roll and delay the cutting off of the web from the expiring roll until the fresh roll has made one revolution, thus insuring a proper paste. To accomplish this it is necessary to retard the swing of the knife into the web path which, as has been described, is effected by the final downward movement of the lever 122.

This lever 122 is actuated by a double acting air cylinder 140 similar to cylinder 110 already described and provided with the usual piston 141, piston rod 142, connected by links 143 to the arm 122, top cylinder head 144 with stuffing-box, air piping 145 and a 4-way valve 146 wherewith air pressure may be applied to either side of the piston 141 to move it up or down.

147 is an oil dash-cylinder, having a piston 148 connected by a piston rod 149 to the piston rod 142, and having a by-pass pipe with a valve 150, and another by-pass pipe with its valve 151, whereby the descent of the piston 148 to the level of the valve 151 may be relatively rapid, depending upon the opening of the valve 151, after which the descent may be as slow as desired, depending upon the opening of valve 150. This latter movement corresponds with that part of the turning of the shaft 123 after the roller 129 has met the paper roll and while the knife 133 is being swung downward and into the path of the web, and is timed to correspond with one revolution of the paper roll. This ensures that the pasting will occur before the web from the expiring roll has been severed, regardless of the angular position of the pasted place upon the fresh roll. The operator need only turn the 4-way valve 146 to effect the pasting or roll change, when the succeeding movements will be effected in their proper sequence and with the proper intervals between them. When the pasting and web severing have been accomplished, the 4-way valve 146 will be reversed and the piston will rise and with it the pasting roller and knife to the positions shown in decks B or C, there to remain out of the way until another fresh roll is to be connected to the running web, when the operation is repeated. The descent of the lever 122 as already described throws the friction clutch 87 out of engagement and applies the brake 116 thereto, to quickly stop the expiring roll from further unwinding after its web has been severed.

Heretofore when renewing rolls, the practice has been to stop the press. While the press speed is being retarded to the stopping point, or is being accelerated from a standstill to full speed, the product is generally improperly folded and otherwise defective and is removed from the delivery belt and rejected. The number of papers lost for each such stoppage or interruption of the printing operation is considerable. To reduce this wastage, it is necessary not only to maintain printing speed while renewing the rolls on any deck, but also to make some distinguishing mark upon the folded copies of the product which will identify them as containing the pasted or doubled web from one of the several rolls of paper from which the product is made. Such marked copies will preferably be marked upon the margin of the outside page, in chalk or marking pencil upon a few copies in advance of and following the pasted place, limiting the copies so marked to the smallest practical number.

To accomplish this result, we utilize the movement of the arms 125 by forming upon one of them a lug 152, provided with a catch-plate 153, which latter is adapted to engage a hook-plate 154 secured to the sliding block 155 upon the rod 156. An upwardly yielding spring 157 acting against a collar 158 upon the rod 156 permits the sliding block to continue its upward movement after the rod 156 has reached the limit of its upward movement. The rod 156 is pivotally connected to a marking lever 159 fulcrumed upon a pivot pin 160 and carrying a marking pencil or crayon 161. This crayon 161 is brought into contact with the running web at about the time that the roller 129 meets the fresh roll, and will therefore begin to make a mark 165' on the web in advance of the pasted place and will continue to mark the web until it is severed or later, depending upon the time when the catch-plate 153 unhooks or releases the hook-plate 154 in its upward movement. The main purpose of the marking of the web is to distinguish the copies containing the paste, rather than to count off any particular number of copies following the paste, as the operator will quickly learn how many copies to remove following the beginning of the mark. A top-screw 162 limits the movement of the pencil arm 159, to prevent excessive pressure upon the pencil or crayon. The latter is adjustably secured to the arm 159 and preferably bears upon the web as it passes over an idle running carrier roller 163.

Obviously the marking of the web may be done in ink or pigment, with a pen, brush or roller, or dripped or sprayed upon or otherwise marked, or the web may be cut or torn or otherwise mutilated to render distinguishable the marked copies of the product as they advance upon the delivery.

The marking of the web may be done at any desired point in the printing operation between the pasting and delivery, or upon the delivery itself and may be applied upon either side of any web and upon either margin thereof to make it distinguishable on the product.

The devices included in the pasting, severing and marking mechanisms and their pneumatic control are similar for the three decks except that the marking lever and crayon are only applied to the web which will be at the outside of the folded product. There will be the same lugs 152, sliding blocks 155 and springs 157 for all decks, but the rods 164 and 165 will extend from the three different arms 125 to the common lever 159 so that a pasting movement at any of the three decks will similarly mark the selected web. As the movements of the catch-plates are lifting actions only, against the lever 159 it follows that there will be no interference between them even though the pasting should occur simultaneously upon all three decks. In this device it is assumed that the lineal distance along each run of web from the paster roll to the point at which the various webs are associated is practically the same. Small differences may be disregarded, but differences greater than can be compensated for within the range of the various adjustments, would obviously require a duplication or triplication of the marker applied at different points to the selected web in order to properly locate the pasted places.

The outside pages are always printed from full width rolls hence the marking device above described when once attached and connected need not be disturbed. Half width rolls are frequently used for printing what is termed a dinkey sheet. The web from the latter is pasted and severed in the same manner as full width webs and would therefore mark the place of its pasting upon the outside or selected web.

The web running from the expiring roll passes around the pasting roller 129 and thence over the free running roller 166. The direction of these web runs is so arranged in relation to the arc or path of movement of the roller 129 that the web will be neither stressed nor slackened by such roller movement in either direction, thereby avoiding web breakage, or slip and failure of the pasting operation.

The exhausted roll, after its web has been severed and its rotation stopped, will remain mounted in the heads. The web now is running from the fresh roll, which is likewise mounted in the heads. The rolls are now in the position shown in A deck. In this position the fresh roll continues to run and feed its web into the press until it has been reduced to approximately half its original diameter or one quarter of its original weight and contents. The operator now throws into engagement the roll holder drive and turns the roll holder to the position shown in deck B, having first started the tension belt drive through the clutch 87. The tension frame 98 may now be swung outward and upward to the position shown in C deck and stopped by throwing out the clutch 88.

In the position shown in B deck the exhausted roll 11' has been moved somewhat forward of its lowest position and the running roll is somewhat beyond its uppermost position. At this time the reel is stopped and the centering plugs 14 in the exhausted roll are withdrawn by backing the hand wheels 16. The exhausted roll will now fall out of place and upon the hinged rail sections 167, which are adjustably sustained by the eccentrics 168, which latter are keyed to the shaft 169, journalled in the rails 99 and are adjustable by a wrench from the front at 170. By this arrangement the exhausted rolls may be of varying diameters, dependent upon the condition of the paper near the center of the roll and the hinged section of the rails or track may be raised to meet the exhausted roll. The fall of the latter is avoided or softened and the outward inclination of the track starts the roll outward, see deck B, Fig. 1. The exhausted roll now rolls or is rolled outward upon the track 99 until it is upon the rollers 37, whose top surfaces form a continuation of tracks 99.

From this position the exhausted roll may be pushed to one side and out of the way of incoming rolls, suitable roller brackets being provided for them at each deck level not shown or the exhausted rolls may be lowered by the same hoisting device which originally lifted them as fresh rolls from the floor. The hoist will be preferably of the usual electrically driven double chain type, not shown on the drawings.

The hinged rail-sections also serve to act as stops to the incoming fresh roll. The latter having been deposited upon the bed extension 4 or the bracket 8 and the exhausted roll having been disposed of, the fresh roll is so placed and the heads are so adjusted in angular position that the taper plugs 14 may be forced into the central tube of the roll at both ends thereof. By causing the roll holder now to turn a short distance, the roll is lifted and is free to revolve.

The outer traction belt has already been described as pocketed up out of the way of the incoming fresh roll by the upward movement of the rack 109. The 4-way valve 115 is now reversed and the traction belts 501 are brought into contact with the fresh roll. The belts are not under motion yet. It has been found that belts running at high speed when brought into contact with a stationary paper roll are apt to tear or wear out the outer layer or wrap of paper before the belts ovecome the inertia of the heavy roll, however nearly frictionless its mounting may be. With the outside layer gone or damaged the pasting operation is generally rendered impossible.

When the traction belts are applied with considerable pressure to the rolls before the belts are started, it is found that by introducing a suitable and sensitive friction clutch coupling into the traction belt drive, the rolls may be started gently and with no damage to the outside layer of paper thereon and with gradual and uniform increase in speed the inertia of the roll is overcome completely and the speed may be brought to correspond with the web speed. As there is no slipping of the belts upon the paper roll, it follows that the belts may be rubber or other material having a high coefficient of friction and may be forced against the paper with high pressure and belt grease may be applied to the belts both inside and out to increase their friction.

Multiple disk clutches are used preferably as being more sensitive and gentler in starting than other types. This arrangement of belt drive also offers advantages in giving a surer control of the roll speed when the press is suddenly stopped or started, after the fresh roll has been speeded up and the clutch is carrying its full load, as the fresh roll responds to every change in speed of the press and does not run ahead and unwind when the press stops, nor does it lag behind when the press starts, thereby tending to break the web.

The friction clutch coupling is introduced into the speed-up drive for safe and gentle starting and reliable speed control of the fresh roll. The friction clutch coupling is introduced into the drive of the traction belts of the expiring roll to continue this control and afford means for a quick stop of the latter after severing the web.

This two-traction belt arrangement gives the operator continuous control of the rolls from the time the fresh roll first begins to revolve until it is cut off and stopped, which control he can not have with any single-traction-belt, as the latter can not act upon two paper rolls at the same time successfully.

Figure 25:
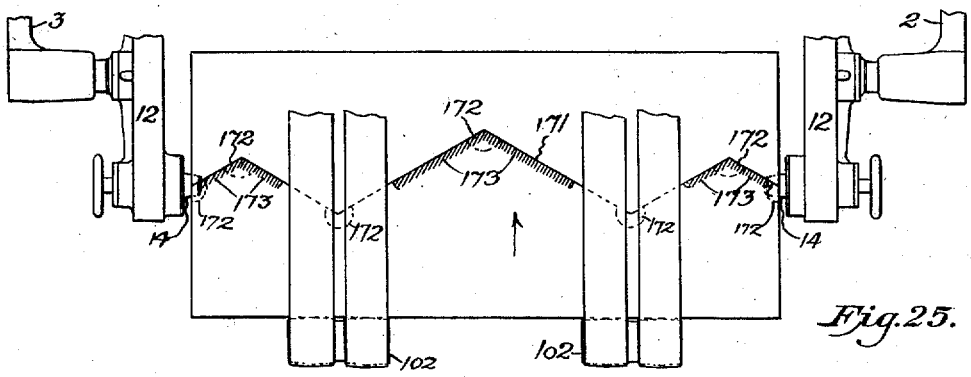
Fig. 25 is a plan view of a full width paper roll showing the normal position of the traction belts and pasted area of the fresh roll.

Fig. 25 shows a paper roll of the usual proportions for printing 4 pages in width. For such a width, two pairs of traction belts for both the speed-up and slow-down would be used instead of one, as shown in the other figures. The advance edge of the web would be trimmed to approximately the outline shown at 171. The points and inner angles would be stuck down to the roll by a relatively weak adherent at the points 172. A much more adhesive paste is applied at the outside margins of the points at 173. A running web pressed against a running roll so pasted will adhere to and take away with it the advance edge 171, which is easily detached from the body of the roll while sufficiently attached to prevent it from unwinding before the running web is applied to it.

Figure 26:
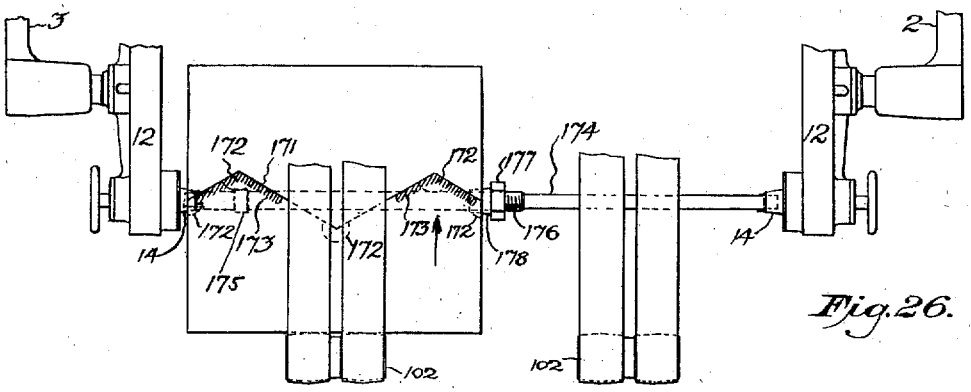
Fig. 26 shows the position of a half width roll of paper and its spindle and pasted area when at one side of the center.

When half-width rolls are used, if entirely at one side of the center, as in Fig. 20 or Fig. 26, a roll spindle 174 is inserted in the roll-tube 13. This spindle is enlarged at 175 to fit freely in the tube, but will be centered approximately therein. Midway of the length of the spindle is a threaded portion 176, upon which is screwed a nut 177 having a tapered projection 178 adapted to enter and fit the inside of tube 13. The taper plugs 14 are bored hollow and receive freely the ends of the spindle 174 against their shoulders, as shown in Figs. 20 and 22. The roll is thus centered and held against endwise movement by its central tube or spindle and is carried by the taper plugs 14, which revolve with the roll in ball bearings as already described.

Figure 27:
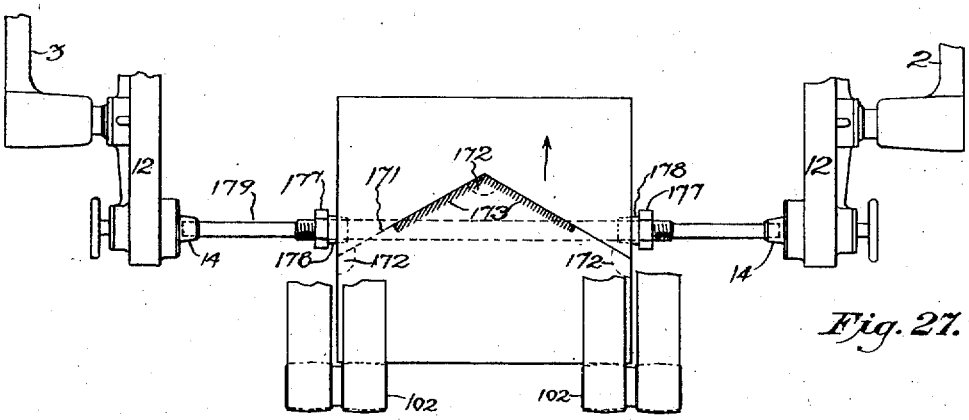
Fig. 27 shows the position of a half width roll of paper when centrally located, with a suitable spindle and pasted area.

When a half-width roll is used in the middle position as in Fig. 27, a spindle of a different type is used, such as 179, upon which are two threaded portions for the nuts 177, the taper projections 178 enter both ends of the central roll tube, thus centering the roll and carrying it in the rotating taper plugs 14 centrally and without endwise freedom.

The advance edge of a half-width roll if placed at one side of the center, would be trimmed and pasted as shown in Fig. 26, or if it occupies a middle position, as in Fig. 27.

The traction belts, if placed as shown, would be in a proper position for driving either full-width or half-width rolls, a full-width roll having 4 belts upon it while a half-width roll would have 2 belts upon it in either position.

Thus it will be seen that full or half-width rolls may be introduced into any deck and the half-width rolls may be in either position without changing any part of the machine.

Platforms and galleries, not shown, will be supplied at both front and rear, for the operators, also cross run-ways 180 and 181 and suitable connections to the printing press as at 182 and 183.

Fig. 39 shows a form of hoisting plug to be used either with or without spindles. It consists of a cylindrical plug, freely fitting the interior of the roll tube 13 and bored hollow at 185, to fit freely over the spindle 174 or 179, so that it may be used as either a plug or a socket or both simultaneously, as would be the case in such a combination as shown in Fig. 26. The exterior of the plug may be corrugated by having a fine screw thread 186 cut upon it, to prevent it from slipping out of the tube 13 when hoisting the roll and for the same reason its interior surface 185 may be corrugated or roughened by having a fine screw thread cut in its interior. The edges, both exterior and interior, are beveled to facilitate its entry into tube 13, or over the end of spindle 174, a shoulder 187 is provided to limit the distance which the plug may be inserted, while an internal shoulder 188 will likewise limit the distance which the spindle may be inserted into it. A clevis 189, pinned to the plug by the removable pin 190, is attached to the hoisting chain 191. There will be two hoisting chains of equal lengh and arranged to hoist equally, whereby the operator need only insert the plugs into the roll tubes to their shoulders, or push them over the ends of the spindles 174 or 179 as far as they will go, to insure the placing of the paper rolls in approximately their correct positions widthwise when deposited upon supports 4 or 8. The plug is extended to form a handle 192, preferably of sufficient weight to balance the plug on the pin 190.

An electric lamp 193 is shown in Figs. 29 and 30, the key 194 of which is turned on by the arm 159 whenever the marker is pushed down to mark the web, thus indicating to the operator that in a few seconds there will appear upon the delivery belt marked copies of the product, containing somewhere within their folds a pasted place. Obviously the electric lamp may be in any convenient position and be electrically controlled from the marker, although at a distance therefrom, in a well known manner. The lamp will be turned off by the reverse movement of the arm 159.

It may be more convenient to use a bell, or other sound signal in connection with or in place of the lamp signal, such sound signals are not shown on the drawings as their construction is well known. With the use of a signal, the operator is saved the necessity of watching the delivery belt for the marked copies, as they will be automatically announced just in advance of their advent.

The operator having the fresh roll suspended in the roll holder and having lowered the belts upon it by the manipulation of the 4-way valve 115 then throws in the clutch 88 by means of the rod 94. When the fresh roll is running at proper speed, the 4-way valve 146 is turned to lower the pasting roll 129 and later the knife 133, after which the 4-way valve 146 is reversed and the paster parts rise to the position shown in deck B.

After sufficient paper has been run off, the next step will be to start the roll holder to bring the rolls into the position shown in deck B. The exhausted roll is then removed and the roll holder is turned to the position shown in deck C, when a new fresh roll may be put in and the operation may be repeated. A similar operation is proceeding upon the other decks whenever rolls become exhausted.

The second traction belts 500 are shown as pressing against the paper rolls 10 or 11 by gravity only. It will be understood that springs or other pressure devices may be employed to assist the action of gravity.

While as before stated, the invention is capable of use in various relations, it is particularly adapted for use in printing machines. In Fig. 43 is illustrated, more or less diagrammatically, the association of the roll changer with a usual rotary perfecting press, the press shown having three printing and perfecting couples, A, B, C, each supplied by a web, the press A being supplied by the web W; press B by the web W'; and press C by the web $W^2$. In the particular embodiment of the invention illustrated the three webs are associated at the folder F, consequently the marking device for throwing out double pasted products has been shown in detail as applied to but one deck or section of the machine. It will be understood, however, that a marking device may, if desired, be provided for each web, the devices being identical with that already described.

Having shown and described a preferred form of the embodiment of the invention, it will be obvious that various changes may be made as regards its form, detail construction and general arrangement without departing from the principle and scope of the invention.

What is claimed is:

1. A roll changer for printing presses, a plurality of brackets, one above the other, for supporting paper rolls, runways or tracks extending inward from said brackets to a plurality of independent roll changing devices, and roll guiding means arranged at an angle to the tracks for shifting the rolls sidewise thereof.

2. In a roll changer for printing presses, a bracket for supporting a paper roll, a runway or track extending inwardly therefrom, over which a roll of paper may be rolled to a roll changing device, and transversely placed rollers forming a portion of said runway, upon which the roll of paper may be shifted in a direction parallel with its axis, to line it up with a roll changing device at the termination of said runway.

3. In a roll changer for printing presses, a runway for a roll of paper, a roll changing device in the path of said roll of paper and transverse rollers in said runway, over which said roll of paper may be rolled on its way to the roll changing device, and over which said roll may be returned when exhausted, said transverse rollers being adapted to facilitate the sidewise shifting of said roll of paper in a direction parallel with its axis, both before and after said roll has been fed to said printing press.

4. In a roll changer for printing presses, a rotary holder for mounting a fresh roll of paper in a manner to permit it to freely rotate about its axis, means located on opposite sides of the roll axis for driving said roll of paper by elements in frictional contact with its external surface, and frictional driving means for said elements.

5. In a roll changer for printing presses, a roll holder for mounting a fresh roll of paper so that it may freely rotate about its axis, means located on opposite sides of the roll axis for driving said roll by frictional contact with its external surface, frictional driving means for said frictional contact means, and means for manipulating the holder to shift the roll from the control of one frictional contact means into the control of the other frictional contact means.

6. In a roll changer for printing presses, a roll holder for mounting a paper roll so that it may freely rotate therein, elements located on opposite sides of the roll axis arranged for frictional contact with the roll, means for starting and accelerating the speed of one of said elements after its contact with the roll, and means for manipulating the holder to bring the roll out of control of one of said elements and into the control of the other.

7. In a roll changer for printing presses, a fresh paper roll mounted to rotate freely in said roll changer, means for bringing friction elements into contact with said roll on opposite sides thereof, and means for driving said elements from a source of power, including a friction coupling, whereby said element may be started and accelerated, after being brought into frictional contact with said fresh roll.

8. In a roll changer for printing presses, a paper roll mounted to rotate freely in said roll changer, traction belts, means for bringing said belts on opposite sides of the roll into contact with said paper roll, and means including a friction cut-off coupling for driving said belt, and a control lever for said friction coupling.

9. In a roll changer for printing presses, a paper roll mounted to rotate freely in said roll changer, in combination with two friction driving elements arranged on opposite sides of the roll, said friction driving elements being so arranged that either or both of said elements are in contact with the periphery of said paper roll during the unwinding of the roll.

10. In a roll changer for printing presses, a paper roll mounted to rotate freely in said roll changer, a belt for starting and speeding up said paper roll, a second belt, and means for moving said paper roll into contact with a second belt, and out of contact with said starting belt.

11. In a roll changer for printing presses, two speed controlling belts and a revolving paper roll movable between them for driving contact with either or both.

12. In a roll changer for printing presses, two independently controlled traction belts and two paper rolls movable between them, both of said belts being likewise movable, whereby frictional contact may be made between said rolls and said belts as required.

13. In a roll changer, the combination of a rotary support for rotatably supporting a web roll, means on each side of the support for frictionally engaging the roll, means for rotating the support to bring the roll out of the control of one of the friction means and into the control of the other friction means, and web severing mechanism for severing the web running from the roll.

14. In a roll changer for printing presses, a pair of roll holding heads having paper roll centering plugs arranged to support two paper rolls at opposite sides of the center of said heads and near the periphery thereof, and gearing adapted to drive both of said heads from a source of power, simultaneously and equally.

15. In a roll changer for printing presses, a paper roll holder, a driving shaft geared thereto, a worm drive for said shaft, and a reversible friction drive for said worm.

16. In a roll changer for printing presses, a plurality of paper roll holders one above the other, and one for each web, a common vertical shaft geared independently to each holder, said gearing including worm gearing and reversible friction gearing, with independent control for the movement of each holder.

17. In a roll changer for printing presses, a vertical shaft driven from the said printing press and geared through frictional and worm gearing independently to a plurality of paper roll holders, and geared also to a plurality of sets of traction belts, there being one set of such belts for each of said holders.

18. In a roll changer for printing presses, a speed-up traction belt whose pulleys are mounted in a swinging frame, means for swinging said frame comprising links and arms actuated through a quadrant gear from a pneumatic cylinder, wherby the said belt may be raised or lowered and pressed against the paper roll.

19. In a roll changer for printing presses, a pasting roller about which the web runs from the paper roll to the printing press, said pasting roller being mounted in arms secured to a shaft, said shaft being so located in relation to the path of the web as it runs to and from said pasting roller that said web will be neither stretched nor slackened as the pasting roller is moved up or down.

20. In a roll changer for printing presses, a roll of paper, a paster roller carried by levers freely mounted upon a shaft, arms secured to said shaft and provided with projecting lugs adapted to engage lugs upon the levers, whereby said arms when rotated will lower said paster roller into contact with said roll of paper, and said arms may continue their downward movement after said levers have been stopped by said roll of paper, and means for rotating said shaft.

21. In a roll changer for printing presses, a revolving fresh roll of paper, a paster roller, a running web trained about said paster roller, means for lowering said paster roller to bring the running web into contact with said fresh roll, said means comprising a rotatable shaft which is adapted to continue its rotation after said contact is made, a cutting mechanism brought into operation by the continued movement of the shaft, and means for rotating said shaft.

22. In a roll changer for printing presses, a paster roller about which is trained a web running from an expiring roll of paper, a revolving fresh roll, a lever for lowering said paster roller to said fresh roll, a knife pivotally mounted in said lever, a lowering arm for said lever whose movement continues after said lever has been stopped by said fresh roll, and a connection from said arm to said knife whereby the latter will be swung into the path of said running web to sever it, said swinging movement of said knife being effected by the continuing movement of said arm after said lever has been stopped.

23. In a roll changer for printing presses, a paster roller for bringing a running web into contact with a running roll of paper to effect a jointure of the two, means for moving the paster roller to effect said contact, a cutting knife, and means continuing to act after said contact to swing the knife into the path of said running web to sever it, said means being timed to permit at least one revolution of the running roll before the knife reaches the web.

24. In a roll changer for printing presses, a paster roller mounted in a lever, a knife mounted in said lever, means for actuating said lever and said knife successively, said means comprising a shaft whose partial rotation in one direction first brings the web from an expiring roll into contact with a fresh roll, then acts to sever the web between said expiring roll and said paster roller.

25. In a roll changer for printing presses, a pasting and web severing device actuated through the same shaft, means for rotating said shaft comprising a lever arm, an air cylinder for operating the said lever arm, and valves to control the operation of said cylinder.

26. In a roll changer for printing presses, an air cylinder for actuating a paster roller and thereafter a web severing knife, and control valves for said air cylinder, in combination with an oil dash-cylinder to retard the operation of said air cylinder.

27. In a roll changer for printing presses, an air cylinder for actuating a paster roller, and thereafter a web severing knife, and a control valve for said air cylinder, in combination with a fluid cylinder to retard the operation of said air cylinder, said fluid cylinder having valve-controlled by-pass connections between its ends whereby its retarding action may be varied.

28. In a roll changer for printing presses, an air cylinder for actuating a paster roller, and thereafter a web severing knife, in combination with a retarding cylinder adapted to control the operation of said air cylinder, a valve-controlled by-pass for permitting a relatively rapid movement of the paster roller into contact with a fresh roll of paper, and another valve-controlled by-pass adapted to control the movement of said air cylinder and its operating connections, after said contact has been made, to retard the knife movement, thereby causing the desired interval to occur between the pasting contact and the severing of the web.

29. In a roll changer for printing presses, an expiring paper roll, a traction belt in contact therewith, means for driving said traction belt, a frictional cut-off coupling included in said driving means, a combined clutch lever and brake for controlling said cut-off coupling, and operative connections between said clutch lever and a web severing device whereby the said clutch will be disengaged at the instant the web is severed.

30. In a roll changer for printing presses, the combination of a knife operating mechanism for severing a web from an expiring roll, with a clutch and brake operating connection for controlling a cut-off coupling in the drive of said expiring roll, whereby the latter may be quickly disconnected and stopped after the web is severed.

31. In a roll changer for printing presses, a paster roller for applying the web running from an expiring roll of paper to the pasted surface of a revolving fresh roll of paper, and a coacting knife for severing said web, and means for operating said paster roller and knife, in combination with a marking device for placing a distinguishing mark upon the web, to indicate the pasted place.

32. In a printing press, a pasting and web severing mechanism in combination with a web marking device connected with said mechanism and operative thereby.

33. In a printing press, a plurality of web pasting and web severing devices in combination with a web marking device, connections from said pasting and severing devices to said marking device, whereby the said marking device is operated by any of the said pasting and severing devices.

34. In a printing press, a plurality of web pasting and web severing devices in combination with a single web marking device, and independent connections from each of said pasting and severing devices for operating said marking device.

35. In a printing press, a roll changing device for each web in use, a marker for marking one of said webs, connections from each of said roll changing devices to said marker, in combination with a signal operated by said marker operating mechanism.

36. In a printing press, a marker for placing a distinguishing mark upon a visible portion of such copies of the product of said press as contain the pasted or doubled portion of any web.

37. In a printing press, the combination of a pasting and web severing mechanism, and means for marking the pasted portions of the joined webs.

38. In a printing press, the combination of a pasting and web severing mechanism, means for marking the pasted portions of the joined webs, and a signal for indicating when the marking device is about to operate.

39. In a printing press, a marker mechanism for marking such copies of the product as contain a double web, and means for operating the mechanism so as to mark a number of products preceding or succeeding the products containing the double web.

40. In a printing press, a marker for marking a web to indicate which portions thereof contain the pasted or doubled place in said web, or in any other web associated therewith, said mark being placed upon said web at the time of pasting any of said webs.

41. In a printing press, means for producing a web mark for indicating upon the product which portion thereof should be removed and discarded, in combination with a signal to announce the making of the web mark.

42. In a roll changer for printing presses, a speed-up friction belt whose pulleys are mounted in a swinging frame, and power operated means for swinging said frame including a pneumatic cylinder, so that the belt may be raised or lowered and pressed against a paper roll mounted in the roll changer.

43. In a printing press, a marking mechanism for marking such copies of the product as contain a double web, and means for operating the marking mechanism.

44. In a roll changing device, a web roll holder including a pair of recessed plugs, a shaft in the plugs on which a roll may be mounted and moved along the shaft, a roll, and means for holding the roll in position on the shaft.

45. In a roll changer, the combination of means for supporting a roll, means located on each side of the support for frictionally engaging the roll, and means for elevating the engaging means and holding said means elevated at one side of the support above an incoming roll to permit such roll to be loaded on the support.

46. In a roll changer, the combination of means for supporting a roll, means on each side of the support for frictionally engaging the roll, and fluid pressure operated means for moving the engaging means at one side out of the way of an incoming roll to permit such roll to be loaded on the support.

47. In a roll changer, the combination of means for supporting a roll, means on each side of the support for frictionally engaging the roll, and fluid pressure operated means for elevating the engaging means at one side out of the way of an incoming roll to permit such roll to be loaded on the support.

48. In a roll changer, the combination of means for rotatably supporting a running roll and a fresh roll, a pasting mechanism, a web severing mechanism, and mechanism for operating the web severing mechanism after the web from the expiring roll has been joined to the fresh roll and the latter has made at least a full revolution.

49. In a roll changer, the combination of means for supporting an expiring roll and a fresh roll, means for frictionally engaging the rolls for driving them, means for uniting the webs from the rolls and severing the expiring web, and means for stopping the expiring roll driving means after the expired web has been severed to prevent unwinding of the expired roll.

50. In a roll changer, the combination of means for supporting a roll, means located on each side of the support for frictionally engaging the roll, and fluid pressure operated means for elevating the engaging means at one side of the support and holding said means elevated so that a roll may be loaded on to the support.

51. In a roll changer, the combination of means for rotatably supporting an expiring and a fresh roll, a frictional driving device on each side of the roll support, a pasting mechanism, a web severing mechanism, and means for operating the web severing mechanism after the web from the expiring roll has been joined to the first roll and the latter has made a full revolution.

52. In a web replenishing device, the combination with a reel adapted to support a plurality of rolls in positions for running, for splicing, and for discharge, means for rotating the roll in splicing position to get it up to web speed, belts in contact with the running roll, means for operating said belts at web speed to keep the running roll rotating constantly and evenly, a web guide engaging the web on the side of the web toward said belts, and means located between the propeller belts and the fresh roll for causing said guide to move automatically bodily toward the fresh web roll and apply the running web positively to the surface thereof to splice it thereto.

53. In a roll changing device, the combination with a pair of driven heads, of web roll holder plugs slidably and rotatably mounted in the heads for supporting a web roll, each of said plugs having an outer surface dimensioned to enter and engage an aperture in the web roll and an inner recess dimensioned to receive a roll supporting spindle, and means for effecting a movement of the plugs in the heads in a line parallel with the axis of the rolls.

54. In a roll changing device, the combination of independent roll supports at opposite ends of the roll mounted for movement sidewise with the roll, means outside the range of movement of the roll and supports for rotating the supports and moving them sidewise and means for moving the supports axially of the roll to hold and release the roll.

55. In a roll changer for a printing press, a movable holder equipped for mounting a plurality of rolls of paper so as to permit them to freely rotate about their axes, in combination with a propeller for starting and speeding up a fresh roll of paper carried by the holder, preparatory to joining the web of said fresh roll to the running web of an expiring roll carried by the holder and before the fresh roll is in contact with the running web, said propeller being adapted to engage the periphery of the fresh roll and to control the tension on the web running from the fresh roll after a join is made, and operating means for securing relative movement of said holder and said starting and speeding up propeller to apply the starting and speeding up propeller to said fresh roll for starting and control of the latter and to separate the starting and speeding up propeller and said expiring roll.

56. In a roll changer for a printing press, a rotary holder equipped for mounting a plurality of rolls of paper in a manner to permit them to freely rotate about their axes, a belt engaging the periphery of the roll for starting and speeding up a fresh roll of paper carried by the holder, preparatory to joining the web of said fresh roll to a web running from an expiring roll carried by the holder and before the fresh roll is in contact with the running web, mechanism for joining the said webs and for severing the web of the expiring roll, said belt being adapted to control the tension on the web running from the fresh roll after a join is made, and operating means for securing relative movement of said holder and said belt to apply the belt to said fresh roll for starting and control of the latter and to separate the belt and said expiring roll.

57. In a roll changer for a printing press, a movable holder equipped for mounting a plurality of rolls of paper so as to permit them to freely rotate about their axes, in combination with a propeller for starting and speeding up a fresh roll of paper carried by the holder, preparatory to joining the web of said fresh roll to the running web of an expiring roll carried by the holder and before the fresh roll is in contact with the running web, said propeller being adapted to engage the periphery of the fresh roll and to control the tension on the web running from the fresh roll after a join is made, and operating means for securing relative movement of said holder and said starting and speeding up propeller to apply the starting and speeding up propeller to said fresh roll for starting and control of the latter and to separate the starting and speeding up propeller and said expiring roll, and means for controlling the tension on the expiring roll after it is out of the control of the starting and speeding up propeller.

58. In a roll changer for a printing press, a rotary holder equipped for mounting a plurality of rolls of paper in a manner to permit them to freely rotate about their axes, a belt engaging the periphery of the roll for starting and speeding up a fresh roll of paper carried by the holder, preparatory to joining the web of said fresh roll to a web running from an expiring roll carried by the holder and before the fresh roll is in contact with the running web, mechanism for joining the said webs and for severing the web of the expiring roll, said belt being adapted to control the tension on the web running from the fresh roll after a join is made, and operating means for securing relative movement of said holder and said belt to apply the belt to said fresh roll for starting and control of the latter and to separate the belt and said expiring roll, and means for controlling the tension on the expiring roll after it is out of the control of the belt.

59. In a roll changer for a printing press, a rotary holder for mounting a plurality of rolls of paper in a manner to permit them to freely rotate about their axes, a belt engaging the periphery of the roll for starting and speeding up a fresh roll of paper carried by the holder, preparatory to joining the web of said fresh roll to a web running from an exhausting roll carried by the holder and before the fresh roll is in contact with the running web, and mechanism for joining the said webs and for severing the web of the exhausting roll; said belt being adapted to control the tension on a web running from the fresh roll after a join is made.

60. In a roll changer for printing presses, a revolving fresh roll of paper, pasting means, a running web in cooperative relation thereto, means for moving said pasting means to bring the running web into pasting contact with said fresh roll, said pasting means including a rotatable shaft carrying the pasting means, a cutting mechanism movable with the pasting means in the pasting movement and brought into cutting operation by movement after the pasting movement is completed, and means for actuating said shaft and cutting mechanism.

61. In a roll changer for printing presses, a revolving fresh roll of paper, pasting means, a running web in cooperative relation thereto, means for moving said pasting means to bring the running web into pasting contact with said fresh roll, and a cutting mechanism movable with said pasting means toward cutting position and movable with relation to said pasting means into cutting position after said pasting contact is made.

IRVING TRUST COMPANY, RECEIVER
IN EQUITY FOR R. HOE & CO., INC.,
*Assignee of Bruce C. White, Deceased,*
By JOSEPH T. STEARNS,
*Assistant Secretary.*